(12) United States Patent
Porikli

(10) Patent No.: US 7,574,043 B2
(45) Date of Patent: Aug. 11, 2009

(54) METHOD FOR MODELING CAST SHADOWS IN VIDEOS

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 683 days.

(21) Appl. No.: 11/167,611

(22) Filed: Jun. 27, 2005

(65) Prior Publication Data

US 2006/0290780 A1 Dec. 28, 2006

(51) Int. Cl.
G06K 9/40 (2006.01)
G06K 9/00 (2006.01)
G06K 9/36 (2006.01)
G06K 9/34 (2006.01)

(52) U.S. Cl. ............... 382/173; 382/103; 382/291; 382/254

(58) Field of Classification Search ............... 382/103, 382/173
See application file for complete search history.

(56) References Cited

U.S. PATENT DOCUMENTS

| | | | | |
|---|---|---|---|---|
| 6,411,744 | B1* | 6/2002 | Edwards | 382/294 |
| 6,999,620 | B1* | 2/2006 | Harville | 382/173 |
| 2004/0228530 | A1* | 11/2004 | Schwartz et al. | 382/173 |
| 2006/0262959 | A1* | 11/2006 | Tuzel et al. | 382/103 |

OTHER PUBLICATIONS

P. KaewTraKulPong and R. Bowden, \An improved adaptive background mixture model for real-time tracking with□□shadow detection, in Proceedings of the 2nd European Workshop on Advanced Video-Based Surveillance Systems,□□Sep. 2001.*
H. T. Chen, H. H. Lin, T. L. Liu, "Multi-object tracking using dynamical graph matching", *CVPR*, 2001.
T. Horprasert, D. Harwood, and L. Davis, "A statistical approach for real-time robust background subt. and shadow detection", *Proc. of IEEE ICCV Frame-rate Workshop*, 1999.
J. Stauder, R. Mech, and J. Ostermann, "Detection of moving cast shadows for object segmentation", *IEEE Transactions on Multimedia*, vol. 1, 1999.
I. Mikic, P. Cosman, G. Kogut, and M. Trivedi, "Moving shadow and object detection in traffic scenes", *ICPR*, pp. vol. 1:321324, 2000.
R. Cucchiara, C. Grana, M. Piccardi, and A. Prati, "Detecting objects, shadows and ghosts in video streams by exploiting color and motion information", *Proc. of IEEE CIAP*, 2001.

(Continued)

*Primary Examiner*—Bhavesh M Mehta
*Assistant Examiner*—Hadi Akhavannik
(74) *Attorney, Agent, or Firm*—Dirk Brinkman; Gene Vinokur

(57) ABSTRACT

A method models a scene. A video is acquired of the scene, and for each frame of the video, the method updates a set of background models for each pixel; a set of shadow models for each pixel; a set of shadow flow vectors for each color; and a background shadow map. Each pixel in each background model and each shadow model is represented by multiple layers. Each layer includes Gaussian distributions and each Gaussian distribution includes a mean and a covariance. The covariance is an inverse Wishart distribution and the updating is according to a recursive Bayesian estimation process.

15 Claims, 5 Drawing Sheets

OTHER PUBLICATIONS

G. D. Finlayson, M. Drew, and C. Lu, "Intrinsic images by entropy minimization", *ECCV,* 2004.

H. Jiang, M. Drew, "Shadow resistant tracking in video", *ICME,* 2003.

T. Gevers and A.W. Smeulders, "Color-based object recognition", *Patt. Rec.,* vol. 32, pp. 453-464, 1999.

O. Javed and M. Shah, "Tracking and object classification for automated surveillance", *ECCV,* 2002.

I. Sato and K. Ikeuchi, "Illumination distribution from brightness in shadows", *ICCV* (2), 875-885, 1999.

E. Salvador, A. Cavallaro, and T. Ebrahimi, "Shadow identification and classification using invariant color models", *ICASSP,* 2001.

T. Zhao, R. Nevatia, "Tracking multiple humans in complex situations", *PAMI,* vol. 26, No. 9, 2004.

C. Stauffer and W. Grimson, "Adaptive background mixture models for real-time tracking", *Proc. IEEE CVPR,* 1999.

A. Mittal and N. Paragios, "Motion-Based background subtraction using adaptive kernal density estimation", *In Proc. Int'l Conf. on Computer Vision and Pattern Recognition,* 2004.

\* cited by examiner

100

METHOD FOR MODELING CAST SHADOWS IN VIDEOS

FIELD OF THE INVENTION

This invention is related generally to computer vision, and more particularly to modeling cast shadows and removing cast shadows.

BACKGROUND OF THE INVENTION

Shadows pose a challenging problem in many computer vision applications. Shadows in images correspond to areas in a background of a scene that are blocked from a light source. Shadows distort the shape and color of an object, making it difficult to detect and track the object. Two types of shadows are defined. Cast shadows are behind an object, with respect to a light source, while self shadows are due to occlusions of the object itself.

Therefore, shadows cast by the object should be removed while self shadows, which are parts of the object itself that are not illuminated, should be retained so that a complete object silhouette can be obtained.

There are a number of cues that indicate the presence of a shadow in an image. For example, pixel luminance within shadow regions decreases, when compared to a reference background. Shadow regions retain a texture of the underlying surface under general viewing conditions. Thus, the intensity reduction rate changes smoothly between neighboring pixels.

Furthermore, most shadow regions do not have strong edges, H. T. Chen, H. H. Lin, T. L. Liu, "Multi-object tracking using dynamical graph matching," *CVPR*, 2001. Spatially, moving cast shadow regions should adjoin the object.

Most prior art shadow removal methods are based on an assumption that the shadow pixels have the same chrominance as the background but with a decreased luminance. One method classifies a pixel into one of four categories depending on a the distortion of the luminance and the amount of the chrominance of the difference, T. Horprasert, D. Harwood, and L. Davis, "A statistical approach for real-time robust background subtraction and shadow detection," Proc. of IEEE ICCV Frame-rate Workshop, 1999. A similar method verifies the above criteria by integrating a color model based on Phong shading, J. Stauder, R. Mech, and J. Ostermann, "Detection of moving cast shadows for object segmentation," IEEE Transactions on Multimedia, vol. 1, 1999. Another method classifies pixels according to a statistical model, I. Mikic, P. Cosman, G. Kogut, and M. Trivedi, "Moving shadow and object detection in traffic scenes," *ICPR*, vol. 1, pp. 321-324, 2000.

Color change under changing illumination is described by a von Kries rule. Each color channel is approximately multiplied by a single overall multiplicative factor.

Some methods remap the color space because the hue of a shadow cast on a background does not change significantly, R. Cucchiara, C. Grana, M. Piccardi, and A. Prati, "Detecting objects, shadows and ghosts in video streams by exploiting color and motion information," Proc. of IEEE CIAP, 2001.

Another method recovers an invariant image from a three-band color image, G. D. Finlayson, M. Drew, and C. Lu, "Intrinsic images by entropy minimization," *ECCV*, 2004. That method finds an intrinsic reflectivity image based on assumptions of Lambertian reflectance, approximately Planckian lighting, and fairly narrowband camera sensors.

A similar method also makes use of an illumination invariant image, H. Jiang, M. Drew, "Shadow resistant tracking in video," ICME, 2003. If lighting is approximately Planckian, then as the illumination color changes, a log-log plot of (R/G) and (B/G) values for any single surface forms a straight line. Thus, lighting change reduces to a linear transformation. Approximately invariant illumination spaces are first used to transform the color space. This color space is approximately invariant to shading and intensity changes, albeit only for matte surfaces under equi-energy white-illumination, T. Gevers and A. W. Smeulders, "Color-based object recognition," Patt. Rec., vol. 32, pp. 453-464, 1999.

Other methods perform image segmentation. For example, a potential shadow region can be segmented into sub-regions, O. Javed and M. Shah, "Tracking and object classification for automated surveillance," ECCV, 2002. For each candidate shadow segment and its respective background, gradients are correlated. If the correlation is greater than a threshold, then the candidate segment is considered a cast shadow, and the cast shadow is removed from the foreground region.

Obviously, one drawback is that not all images include statistically significant amounts of object surfaces corresponding to both directly lit and shadowed pixels. Furthermore, the lighting color of the umbra region is not always the same as that of the sunshine.

One method removes shadows using a measure of brightness, I. Sato and K. Ikeuchi, "Illumination distribution from brightness in shadows," ICCV (2), pp. 875-882, 1999. The image is segmented into several regions that have the same density. Shadow regions are determined based on the brightness and the color. That method can be extended by applying maximum and minimum value filters followed by a smoothing operator to obtain a global brightness of the image. From the global brightness, the shadow density can be determined, M. Baba and N. Asada, "Shadow removal from a real picture," SIGGRAPH Conference on Sketches and Applications, 2003.

Another method segments the image in two stages, E. Salvador, A. Cavallaro, and T. Ebrahimi, "Shadow identification and classification using invariant color models," ICASSP, 2001. The first stage extracts moving cast shadows in each frame of a sequence of frames. The second stage tracks the extracted shadows in subsequent frames. Obviously, the segmentation-based approach is inherently degraded by inaccuracies of the segmentation.

A geometrical method assumes that the shadow is in form of an ellipsoid. Any foreground pixel which lies in the shadow ellipse having an intensity that is lower than that of the corresponding pixel in the background, according to a threshold, is classified as a shadow pixel, T. Zhao, R. Nevatia, "Tracking multiple humans in complex situations," PAMI, vol. 26, no. 9, 2004.

Unfortunately, the assumptions of the above methods are difficult to justify in general. Detection based on the luminance-based criteria fails when pixels of foreground objects are darker than the background and have a uniform gain with respect to the reference background. Color space transformations are deficient when the background color is gray. Geometrical shadow models depend heavily on the viewpoint and the object shape. It is not possible remove shadows correctly for a wide range of conditions with several predefined parameters. Another limitation of the above methods is that those methods do not adapt to different types of shadow, e.g., light due to a weak ambient light source, or heavy due to strong spotlights.

One observation is that cast shadows constitute a 'prevalent' change in color. In other words, a color change at a pixel due to an object has a higher variance, because the object can have different colors when compared to a color change due to cast shadows. For a pixel, cast shadows cause identical background color change. However, color changes caused by object motion are different in the case where the object colors are different, which is the usual case.

SUMMARY OF THE INVENTION

A method models cast shadows in a video by taking advantage of a statistical prevalence of shadowed regions over object regions. Shadows are modeled using multivariate Gaussians distributions.

A weak classifier is applied as a pre-filter for subsequent processing. The shadow models are projected into a quantized color space to update a shadow flow function. A shadow flow, background models, and a current frame are used to distinguish shadow regions and object regions.

As an advantage, the method does not require a color space transformation to estimate shadows. The problem is solved in a RGB color space, as well as in other Cartesian spaces, i.e., CMY, YUV, etc., in which the orthogonal axes are used to span the space. Thus, it is not required to apply other computationally expensive projective transformations.

The method is also data-driven and automatically adapts to the changing shadow conditions.

An accuracy of the method is not limited by preset threshold values. Furthermore, the model does not assume a 3D model for the objects or the tracking of the cast shadows in a sequence of frames.

DETAILED DESCRIPTION OF THE PREFERRED EMBODIMENT

Figure 1:
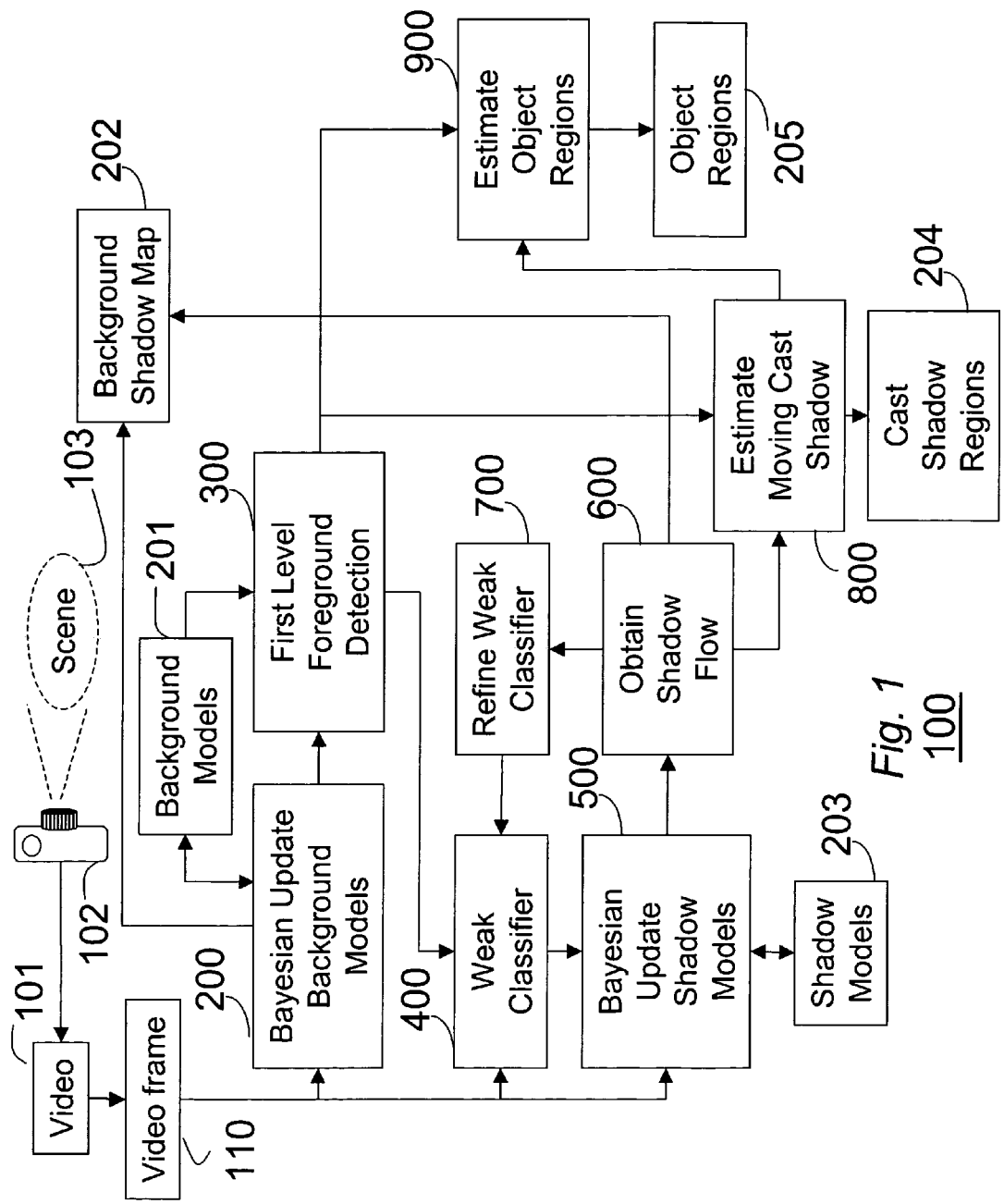
FIG. 1 is a flow diagram of a method for modeling cast shadows.

FIG. 1 shows a method 100 for modeling cast shadows according to one embodiment of the invention. The models can be used to detect and remove cast shadows. In another embodiment of the invention, objects regions are also estimated.

A video 101 is acquired by a camera 102 of a scene 103. A set of background models 201, a background shadow map 202, and a set of shadow models 203 are initialized for the scene, as described in greater detail below. Then, for each frame 110 of the video and each pixel in each frame, the following steps are performed.

A recursive Bayesian process updates 200 the background models 201 and the background shadow map 202. The background model is used to perform a first level foreground detection 300. The pixel is weakly classified 400 as being either a foreground pixel (C), a shadow pixel (S), or an unknown pixel (U), see below. Only the shadow pixels are used to update 500 the shadow models 203, also using a Bayesian procedure, described in greater detail below.

The shadow pixels are used to obtain 600 a shadow flow. The shadow flow can be used to refine 700 the weak classifier. The shadow flow is also used to update the background shadow map 202, and to estimate 800 moving cast shadow regions 204. The moving cast shadow regions can also be used to estimate 900 object regions 205.

The recursive data-driven method 100 models color change induced by shadows observed in the video 101 in terms of multivariate Gaussian distributions. The method is particularly useful for video surveillance, entertainment, and interactive applications where the video can include shadows due to moving objects, hand gestures, and the like. It is desired to remove such shadows.

The set of models are trained adaptively for shadow changes at each pixel in each frame 110 of the video 101. The models are updated for each frame (image) of the video. Thus, if the lighting condition changes due to properties of a shadow, then the models are adapted dynamically to the changing lighting conditions.

The set of shadow models 203 of a pixel are updated only if the pixel is labeled as a shadow pixel by the weak classifier 400. The classifier serves as a pre-filter for the subsequent processing.

The data-driven method 100 recursively adapts the set of shadow models to the input video 101. In other words, an accuracy of the method is not limited by preset threshold values, which is a major drawback of the prior art methods. The accuracy of the method 100 improves as more frames 110 of the video 101 are processed.

Furthermore, the method 100 does not require tracking of the cast shadows. In addition, the method does not require a special color space, as in the prior art. Instead, the problem is posed in the RGB color space. The method can also be worked in other Cartesian spaces. The method does not require a 3D model of objects in the scene 103.

Learning Cast Shadows

Each current frame 110 (image), in a sequence of images (video) 101, at time t, is $I_t(p_{x,y})$, where $p_{x,y}$ represents the pixels in the image at location x, y.

Two sets of models are trained: a set of background models $B^n_t(p)$ 201; and a set of shadow model $S^m_t(x)$ 203, where n is the number of background models, and m is the number of shadow models.

The operations of the method are performed in a RGB color space. First, we estimate a reference or background model for a stationary part of a scene. This can be performed from a first frame in the video or an image acquired of the scene by other means.

Each current frame 110 is compared with the set of background models 201 to determine changed regions in the image. The changed regions can include objects and moving cast shadows. We use background subtraction to discriminate a moving object in a relatively static scene and to perform first level detection 300 to locate possible foreground pixels.

As described below, we define each pixel as layers of multivariate Gaussian distributions. We define a 'layer' as a set of ordered models of all pixels with respect to model confidence scores. Each layer corresponds to a different appearance of the pixels.

A most consistent of these layers is considered the background. To locate foreground pixels, we compare the pixels of each current frame 110 to the background layers that form the set of background models 201.

Then, we apply the weak classifier 400, which evaluates color and spatial changes of the foreground pixels. The weak shadow classifier defines a range of possible colors with respect to the background color, and iteratively updates classification labels of the pixel using a local consistency, as described below.

If a pixel p is detected as a foreground pixel, and a color of the pixel is in a predetermined range as determined by the weak classifier 400, then we update the set of shadow models $S^m_t(p)$ 203 for the pixel p.

Figure 2:
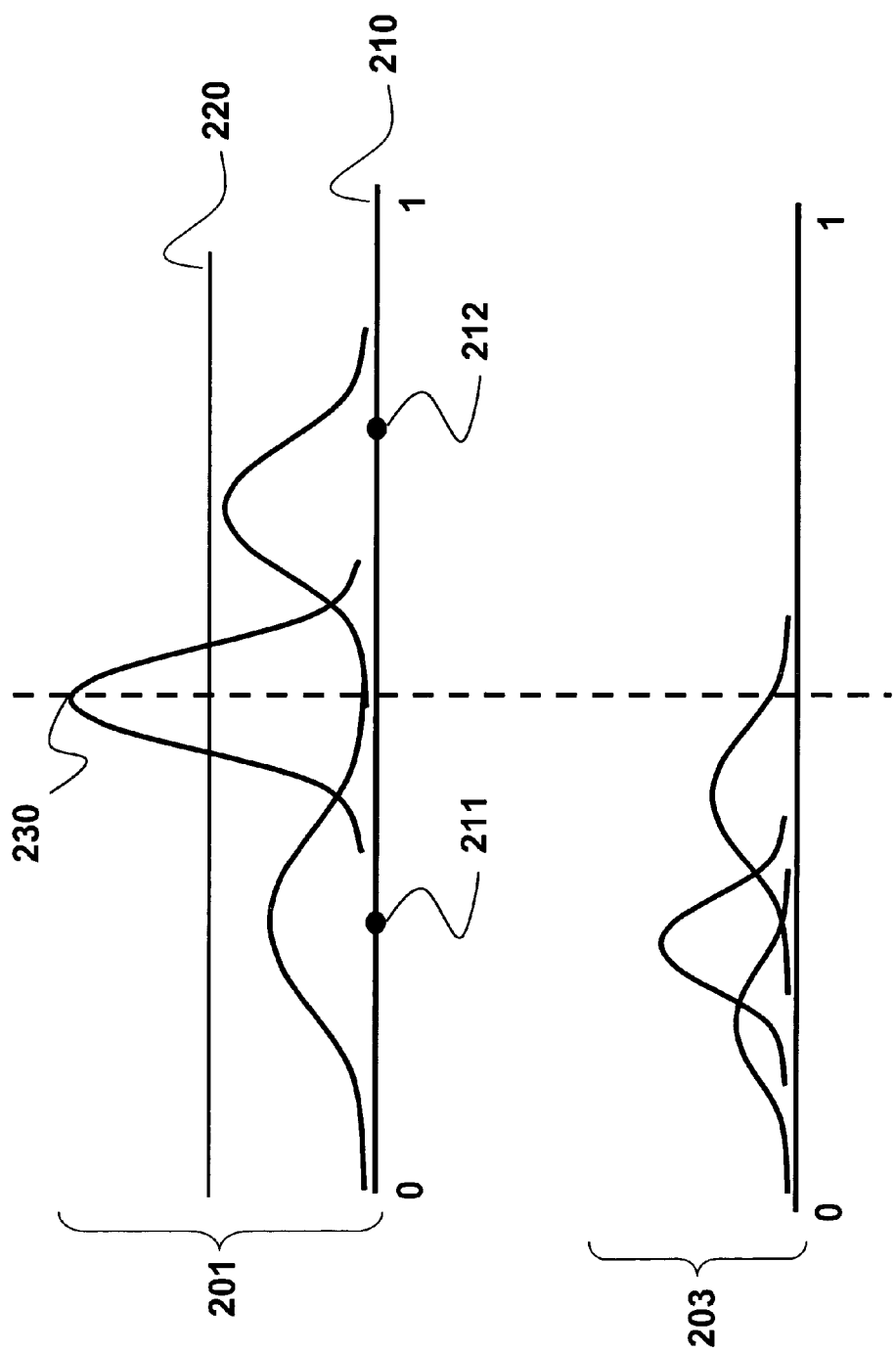
FIG. 2 is a diagram of updating background and shadow models in one dimension.

FIG. 2 shows the updating of the background models 201 and the shadow models 203, in one dimension. In FIG. 2, the horizontal axis 210 indicates the pixel intensity in a normalized dark-to-bright range [0, 1], and line 220 is a foreground decision threshold separating the background (above) from the foreground (below). The background models include a most confident background model 230. If a current pixel 211 is darker and classified as a shadow pixel, then the shadow models 203 are updated. If a pixel 212 is brighter, then the shadow models are not updated.

The recursive Bayesian update procedure determines a confidence score for each model. We determine a most confident shadow model $S^*_t(p)$ for each pixel. We compare the most confident shadow model $S^*_t(p)$ with the most confident background model $B^*_t(p)$, and determine a disparity vector $$S^*_t(x,\mu)-B^*_t(p,\mu),$$

where μ is a mean of the model.

We project the disparity vectors into a quantized color space, in which each bin represents a color value in the background.

More than one disparity vector can be assigned to each bin because there can be multiple pixels with the same color but different disparities in the background.

Shadow Flow

Figure 4:
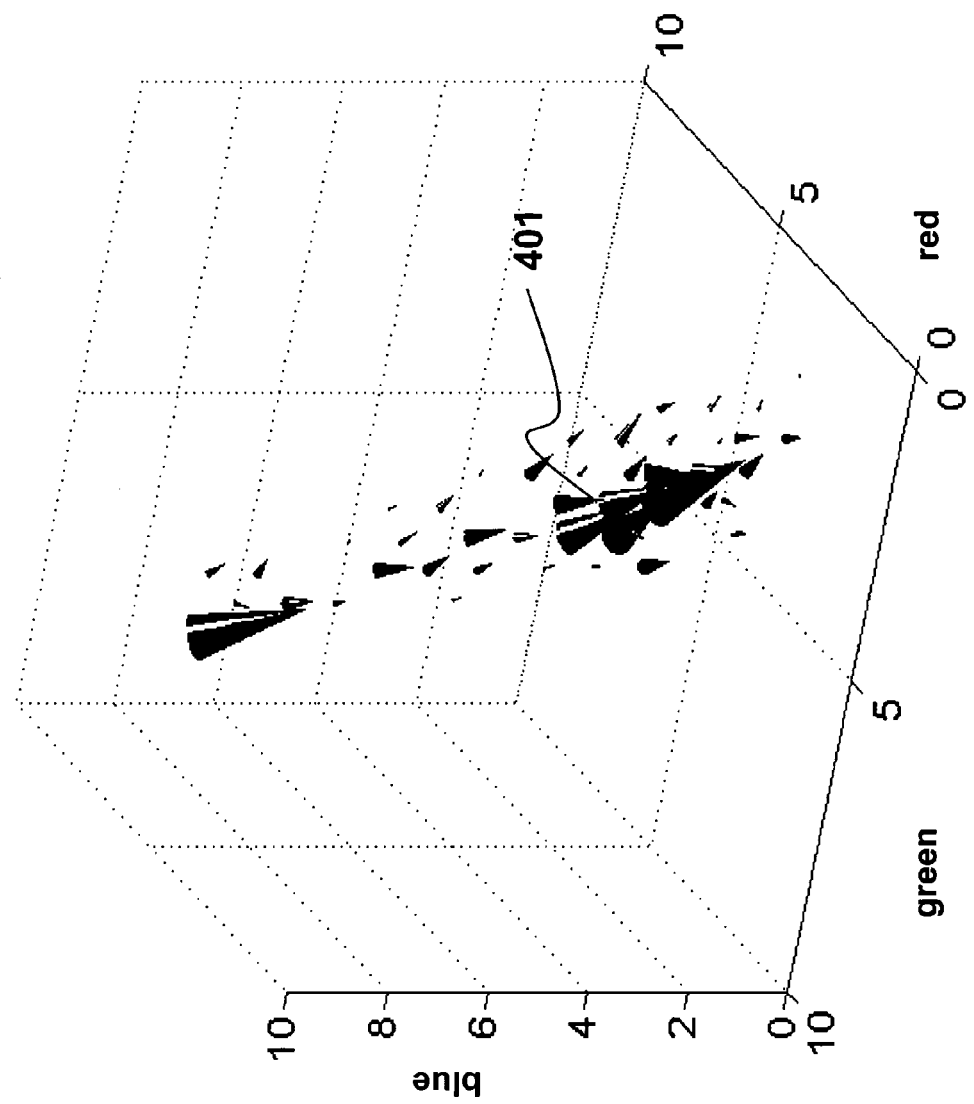
FIG. 4 is schematic of shadow flow vectors.

As shown in FIG. 4 for the (RGB) color space, we aggregate disparity vectors weighted by the model confidences, and determine a mean $F_t(c, \mu)$ and a variance $F_t(c, \sigma)$ for each bin c to obtain a shadow flow $F_t(c)$. The shadow flow vectors 401 for different shadow types and different backgrounds are different.

To find the shadow pixels in the foreground, we back-project the shadow flow $F_t(c)$ to a shadow image $$SI_t(p)=F_t(B^*_t(p),\mu),$$

using the background image. Finally, we compare the current foreground pixels and the shadow image to determine the shadow pixels using the shadow color variance $F_t(c, \sigma)$.

Figure 5:
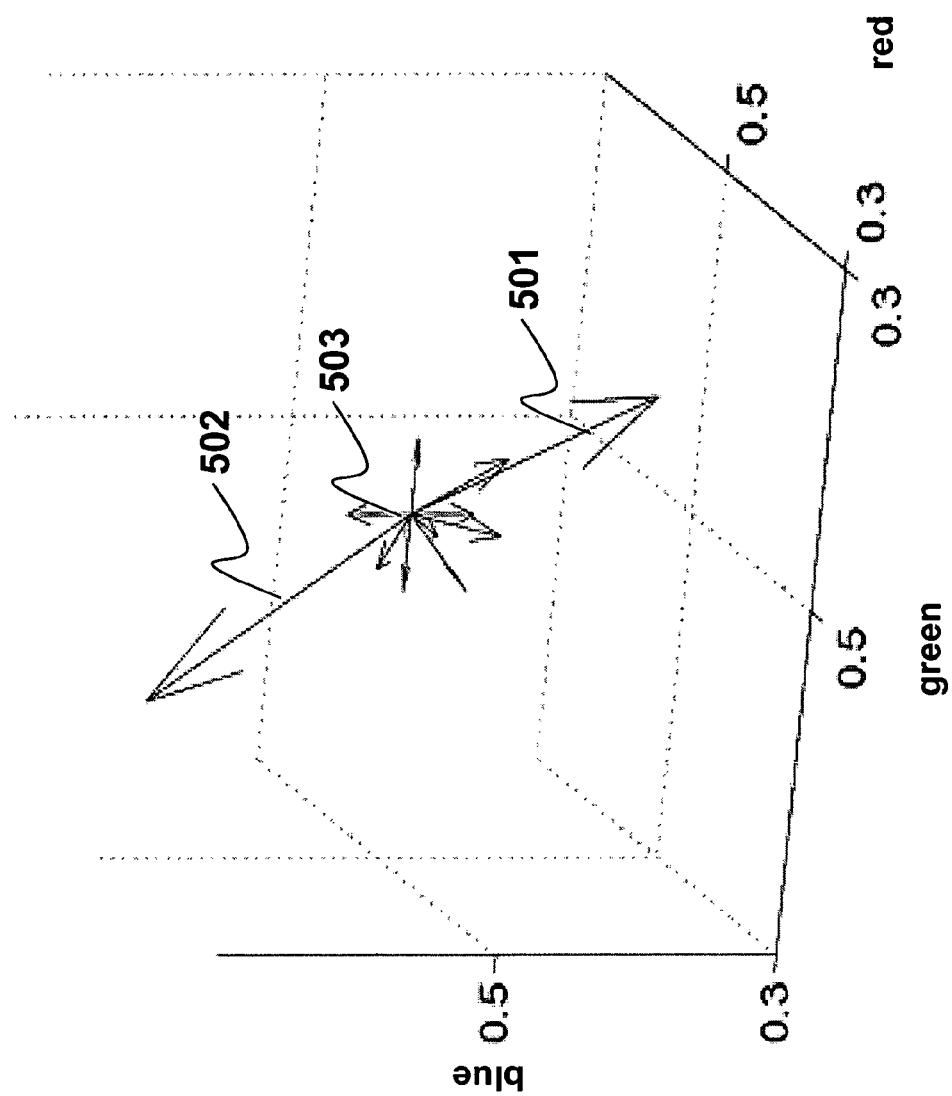
FIG. 5 is a schematic of a single shadow bin with a corresponding shadow flow vector and current image color change vector.

FIG. 5 shows a single shadow bin in the (RGB) color space with a corresponding shadow flow vector 501, a current image color change vector 502 corresponding to a single color bin for foreground pixels, and color change vectors 503 of pixels that are classified as background. It is also possible to use the shadow flow to determine the quality of foreground estimation.

Weak Shadow Classifier

The weak shadow classifier 400 evaluates each pixel and determines whether the pixel is possibly a shadow pixel or part of a foreground object. Here, we do not make a final decision about the classification. Hence, the classification is weak. Instead, we select pixels that are used to update the multivariate shadow models in the following steps. It should be noted that other types of classifiers can be used, e.g., a weak brightness classifier. If a weak brightness classifier is used, then it becomes possible to detect highlighted, i.e., brighter, regions in the scene. This enables the detection of illumination changes.

To classify foreground pixels, we measure a Mahalanobis distance between the pixel color and the mean values of confident background layers in the models 201. Pixels that are outside of a 99% confidence interval of all confident layers of the background are classified as foreground pixels.

First, we determine whether a pixel is a possible shadow pixel by evaluating the color variation. We assume that shadow decreases the luminance and changes the saturation, yet it does not affect the hue.

Figure 3:
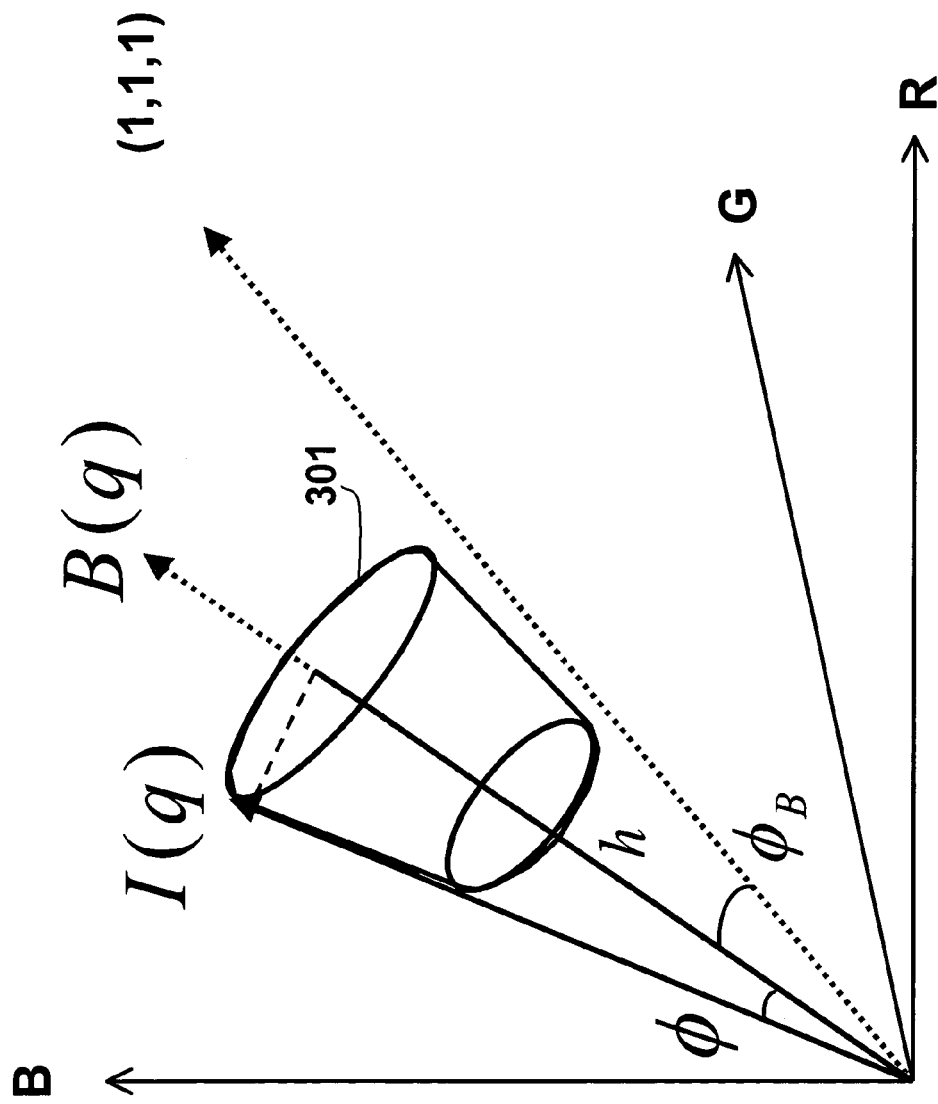
FIG. 3 is a conic volume representing a weak shadow around a corresponding background color of a pixel.

The projection of the color vector to the background color vector yields a luminance change h $$h=|I(p)|\cos \phi, \quad (1)$$

where ϕ is an angle between the background $B^*_t(p)$ and $I_t(p)$. We define a luminance ratio as $r=|I_t(p)|/h$. A second angle $\phi_B$ between the $B^*_t(p)$ and the white color (1,1,1) is determined. Thus, we define a shadow as a conic 301 around the background color vector $B_q$ in the (RGB) color space as shown in FIG. 3.

For each possible foreground pixel, we apply the following test and classify the pixel as a shadow pixel when the pixel meets both of the following conditions:

$$\phi<\min(\phi_B, \phi_0), \text{ and}$$

$$r_1<r<r_2, \quad (2)$$

where $\phi_0$ is a maximum angle separation and $r_1<r_2$ determines maximum allowed darkness and brightness. We also limit the angle to a maximum separation in the above equation as $\phi<\min(\phi_0)$ in cases that the color variation is not upper limited by the background color value.

Only the pixels that satisfy the above conditions are classified as possible shadow pixels.

At a second stage, we refine the shadow pixels by evaluating their local neighborhood. If the illumination ratios of adjacent shadow pixels are dissimilar, then the pixels are unknown.

Inside a 'window' of a predetermined size placed around a particular pixel, the number of foreground pixels C, shadow pixels S, and unknown pixels U are counted, to determine a local consistency, and the following rules are applied iteratively to weakly classify pixels:

(C>U)^(C>S)→C, (S>U)^(S>C)→S, and

U otherwise.

After we aggregate the flow vectors for all color bins, we refine the above parameters of the weak classifier 400 using α-blending.

After we select the shadow pixels, we update the set of multivariate shadow models 203 using a Bayesian update process 500 that is described below. We use the same update mechanism for the background models. We do not deform our models with noise or foreground pixels, but do adapt to smooth intensity changes. An embedded confidence score determines the number of layers to be used and prevents unnecessary layers.

Using the Bayesian process, we estimate a probability distributions of the mean and the variance, and not the mean and variance of the layer. We can extract statistical information regarding these parameters from the Gaussian distribution functions.

Bayesian Update

Instead of a 'mixture' of Gaussian distributions, we define each pixel as 'competitive' layers of multivariate Gaussian distributions, see U.S. patent application Ser. No. 11/133,894 entitled "Modeling Low Frame Rate Video with Bayesian Estimation," which was filed on May 20, 2005 by Tuzel et al. and is incorporated herein by reference for additional details. Each layer corresponds to a different appearance of the pixel.

Our update process maintains a multi-modality of the models. During each update, at most one layer is updated with the current observation. This assures a minimum overlap over layers.

We also determine how many layers are necessary for each pixel and use only those layers during foreground segmentation phase. The mean $\mu$ and the variance $\Sigma$ of the pixel color history are unknown and modeled as normally distributed random variables.

To perform recursive Bayesian estimation, a joint prior density $p(\mu\Sigma)$ has the same form as the joint posterior density $p(\mu, \Sigma|X)$. Conditioning on the variance, the joint prior density can be expressed as:

$$p(\mu,\Sigma)=p(\mu|\Sigma)p(\Sigma). \quad (3)$$

The above condition is realized when we assume an inverse Wishart distribution for the covariance and, conditioned on the covariance, multivariate normal distribution for the mean. The inverse Wishart distribution is a multivariate generalization of a scaled inverse-$\chi^2$ distribution.

The parameterization is $$\Sigma \sim \text{Inv-Wishart}_{v_{t-1}}(\Lambda^{-1}_{t-1}), \text{ and} \quad (4)$$

$$\mu|\Sigma \sim N(\theta_{t-1}, \Sigma/\kappa_{t-1}), \quad (5)$$

where $v_{t-1}$ and $\Lambda_{t-1}$ are the degrees of freedom and scale matrix for inverse Wishart distribution, $\theta_{t-1}$ is the prior mean, and $\kappa_{t-1}$ is the number of prior measurements.

With these assumptions, the joint prior density becomes the normal inverse-Wishart ($\theta_t, \Lambda_t/\kappa_t; v_t, \Lambda_t$) with the parameters updated according to:

$$v_t = v_{t-1} + n \quad k_n = k_{t-1} + n \quad (6)$$

$$\theta_t = \theta_{t-1}\frac{k_{t-1}}{k_{t-1}+n} + \bar{x}\frac{n}{k_{t-1}+n} \quad (7)$$

$$\Lambda_t = \Lambda_{t-1} + \sum_{i=1}^{n}(x_i-\bar{x})(x_i-\bar{x})^T + n\frac{k_{t-1}}{k_t}(\bar{x}-\theta_{t-1})(\bar{x}-\theta_{t-1})^T \quad (8)$$

where $\bar{X}$ is the mean of new samples, and n is the number of samples used to update the model. If the update is performed for each frame, then n becomes one.

We use expectations of marginal posterior distributions for the mean and covariance as our model parameters at time t. The expectation for the marginal posterior mean, i.e., the expectation of multivariate t-distribution, becomes:

$$\mu_t = E(\mu|X) = \theta_t, \quad (9)$$

whereas the expectation of the marginal posterior covariance, i.e., the expectation of the inverse Wishart distribution becomes:

$$\Sigma_t = E(\Sigma|X) = (v_t-4)^{-1}\Lambda_t \quad (10)$$

Our confidence measure for the layer is equal to one over the determinant of the covariance of $\mu|X$:

$$C = \frac{1}{|\Sigma_{\mu|X}|} = \frac{k_t^3(v_t-2)^4}{(v_t-4)|\Lambda_t|}. \quad (11)$$

If the marginal posterior mean has a larger variance, our model becomes less confident. The variance of the multivariate t-distribution with scale matrix $\Sigma$ and degrees of freedom $v$ is equal to $(v/(v-2))\Sigma$ for $v>2$. Instead of using the multivariate Gaussian distribution for a single layer, it is possible to use three univariate Gaussian distributions corresponding to each color channel. In this case, for each univariate Gaussian, we assume a scaled inverse-$\chi^2$ distribution for the variance and, conditioned on the variance, univariate normal distribution for the mean.

We initialize our system with k layers for each pixel. Usually, we select three to five layers for both background and shadow models. Highly dynamic scenes can use a larger number of layers.

For new samples of each pixel, we update the parameters for models. We start our update process with the most confident layer in our models. If the sample is inside the 99% confidence interval of the current model, parameters of the model are updated according to Equations 6-8.

Models with lower confidence models are not updated. A depletion mechanism can be used to minimize the effect of past observations. Depletion is performed by reducing the number parameters of prior observations of an unmatched model. If the current sample is not inside the confidence interval, then we update the number of prior measurements parameter $k_t$=k-1-n, and proceed with the update of next confident layer.

We do not let $k_t$ become less than an initial value of ten. If none of the models are updated, then we delete the least confident layer, and initialize a new layer with the current sample.

Our confidence score is very effective in determining the number of necessary layers for each pixel. Although we estimate the model parameters with five layers, our confidence scores clearly indicate the number of layers required for the method to be effective. There is a big gap between significant and insignificant layers.

EFFECT OF THE INVENTION

A method models a scene including cast shadows from videos, such as surveillance videos, acquired of a scene. The method is an adaptive shadow flow method that learns the properties of cast shadows automatically from the video by using multivariate Gaussian distributions to model the background and shadows in the scene over time, making the method data-driven.

The invention also provides a method to update the models. The method has several advantages. The method does not require a color space transformation. We pose the problem in the RGB color space, and we can carry out the same analysis in other Cartesian color spaces that are spanned by orthogonal axes such as CMYK, YUV, YCbCr, etc., as well.

The data-driven method dynamically adapts the shadow models to changing shadow conditions. In other words, the accuracy of our method is not limited by preset threshold values, which is a major drawback of prior art methods. The accuracy of the method improves as more frames of the video are processed. Furthermore, the model does not assume any 3D models for objects in the scene or the tracking of the cast shadows in a sequence of frames.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed is:

1. A method for modeling a scene, comprising the steps of:
acquiring a video of a scene with a camera, and for each frame of the video:
in a computer:
- updating, for each pixel, a set of background models;
- representing the pixels in each background model and each shadow model with a plurality of layers, each layer including a plurality of Gaussian distributions, each Gaussian distribution including a mean and a covariance, the covariance being an inverse Wishart distribution, and the updating is according to a recursive Bayesian estimation process;
- updating, for each pixel, a set of shadow models;
- updating, for each background color, a set of shadow flow vectors from the set of shadow models;
- determining, for each pixel, a confidence score for each model;
- comparing, for each pixel, a most confident shadow model with a most confident background model to determine a disparity vector;
- projecting the disparity vectors into a quantized color space including bins, each bin representing a color value in a background of the scene; and
- aggregating, for each bin, the projected disparity vectors to locate the shadow flow vector in each bin; and
- updating, for each pixel, a background shadow map using the set of shadow flow vectors to detect shadows in the video.

2. The method of claim 1, further comprising:
classifying weakly each pixel as a foreground pixel, a shadow pixel or an unknown pixel, and further comprising:
updating the set of shadow models only for the shadow pixels.

3. The method of claim 2, further comprising:
obtaining a set of shadow flow vectors from the set of shadow models.

4. The method of claim 3, further comprising:
refining the classifying according to the set of shadow flow vectors.

5. The method of claim 3, further comprising:
updating the background shadow map according to the set of shadow flow vectors.

6. The method of claim 1, further comprising:
estimating an object region using the set of background models and the set of shadow models.

7. The method of claim 1, further comprising:
estimating an object region using the set of background models and the background shadow map.

8. The method of claim 1, further comprising:
estimating a moving cast shadow region by comparing a color change of the pixel in the frame with a corresponding pixel in the background shadow map.

9. The method of claim 1, in which the video is a surveillance video.

10. The method of claim 1, further comprising:
acquiring the video with a stationary camera.

11. The method of claim 1, in which the video is an entertainment video.

12. The method of claim 1, in which the video is an interactive video.

13. The method of claim 1, further comprising:
weighting the projected disparity vectors by the confidence scores of the models.

14. The method of claim 2, in which the classifying uses a weak brightness classifier to detect illumination changes in the scene.

15. The method of claim 3, further comprising:
determining a maximum darkness threshold and a maximum brightness threshold of the weak classifier by a mean of the set of shadow flow vectors.

* * * * *